United States Patent
Tyldesley et al.

(10) Patent No.: US 7,911,137 B2
(45) Date of Patent: Mar. 22, 2011

(54) ELECTROLUMINESCENT DISPLAYS INCLUDING AN INTERMEDIATE DIFFUSING LAYER BETWEEN AN ELECTRODE AND A LAYER OF ELECTROLUMINESCENT MATERIAL

(75) Inventors: William Frank Tyldesley, Norfolk (GB); Stephen Green, Cardiff (GB)

(73) Assignee: Mflex UK Limited, Cambridge (GB)

( * ) Notice: Subject to any disclaimer, the term of this patent is extended or adjusted under 35 U.S.C. 154(b) by 657 days.

(21) Appl. No.: 11/813,418

(22) PCT Filed: Jan. 6, 2006

(86) PCT No.: PCT/GB2006/000042
§ 371 (c)(1),
(2), (4) Date: Jan. 3, 2008

(87) PCT Pub. No.: WO2006/072796
PCT Pub. Date: Jul. 13, 2006

(65) Prior Publication Data
US 2008/0218075 A1    Sep. 11, 2008

(30) Foreign Application Priority Data
Jan. 7, 2005   (GB) .................................. 0500268.8

(51) Int. Cl.
*H01J 1/62* (2006.01)
*H01J 63/04* (2006.01)

(52) U.S. Cl. ........ 313/509; 313/483; 313/503; 313/504; 313/505; 313/506

(58) Field of Classification Search .............. None
See application file for complete search history.

(56) References Cited

U.S. PATENT DOCUMENTS

| | | | |
|---|---|---|---|
| 4,455,506 A | 6/1984 | Ayyagari et al. | |
| 4,670,355 A | 6/1987 | Matsudaira et al. | |
| 4,870,322 A | 9/1989 | Matsudaira et al. | |
| 5,488,266 A | 1/1996 | Aoki et al. | |
| 5,856,031 A * | 1/1999 | Burrows | 428/690 |
| 6,811,895 B2 * | 11/2004 | Murasko et al. | 428/690 |
| 7,088,039 B2 * | 8/2006 | Barnardo et al. | 313/510 |

FOREIGN PATENT DOCUMENTS

| | | |
|---|---|---|
| EP | 0 273 320 A1 | 7/1988 |
| EP | 0 313 656 A1 | 5/1989 |
| EP | 1 206 167 B1 | 5/2002 |
| WO | 2005/015958 A | 2/2005 |

OTHER PUBLICATIONS

Official Communication issued in corresponding United Kingdom Patent Application No. 0713637.7, mailed on Aug. 11, 2010.
Tyldesley, "Electroluminescent Displays", U.S. Appl. No. 12/113,239, filed May 1, 2008.

* cited by examiner

*Primary Examiner* — Nimeshkumar D Patel
*Assistant Examiner* — Natalie K Walford
(74) *Attorney, Agent, or Firm* — Keating & Bennett, LLP

(57) ABSTRACT

An electroluminescent display comprising a substrate (1), a substantially transparent electrode (2) adjacent to the substrate, a layer of electroluminescent material (3) adjacent to the substantially transparent electrode, a layer of dielectric material (4) adjacent to the layer of electroluminescent material and a further electrode (5) adjacent to the dielectric layer, in which there is further provided an intermediate layer (6) between the substantially transparent electrode and the layer of electroluminescent material. The intermediate layer typically acts as a diffuser and may comprise Barium Titanate.

33 Claims, 3 Drawing Sheets

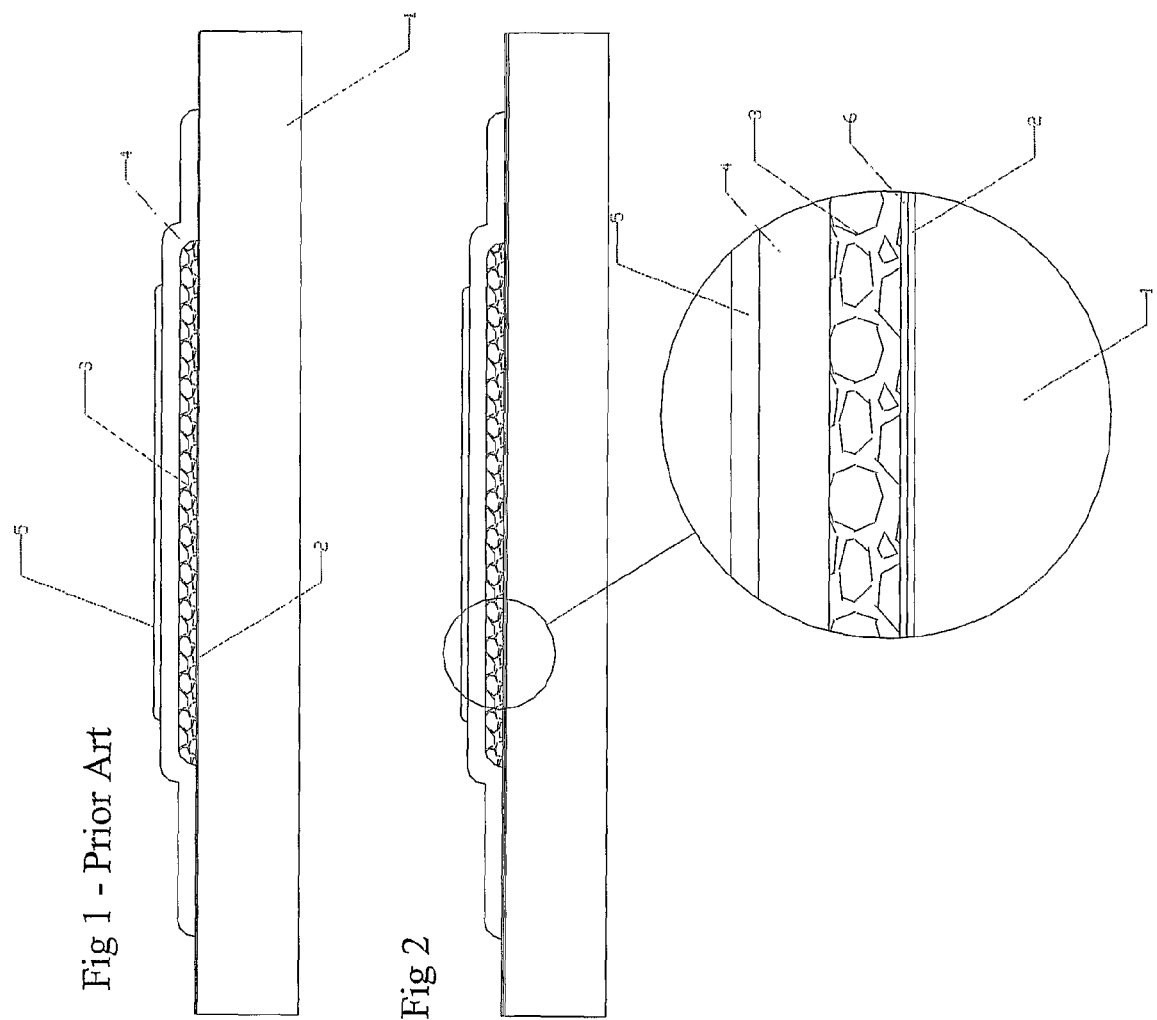

ELECTROLUMINESCENT DISPLAYS INCLUDING AN INTERMEDIATE DIFFUSING LAYER BETWEEN AN ELECTRODE AND A LAYER OF ELECTROLUMINESCENT MATERIAL

This application claims priority to PCT Application Serial No. PCT/GB/2006/000042, filed Jan. 6, 2006, which claims priority to British Application Serial No. 0500268.8, filed Jan. 7, 2005. The contents of both priority applications are hereby incorporated by reference.

TECHNICAL FIELD

This invention relates to electroluminescent displays and to a method of making the same.

BACKGROUND OF THE INVENTION

Electroluminescent (EL) displays are known in the prior art, and generally comprise a substrate (such as PET) onto which a transparent electrode (such as Indium Tin Oxide—ITO) has been deposited. A layer of phosphor such as a zinc sulphide (ZnS) powder doped with Copper (Cu) and Chlorine (Cl) is deposited on the transparent electrode. A dielectric material comprising a Titanate compound such as Barium Titanate is deposited on the phosphor layer. Further electrodes—typically comprising silver or graphite as a screen-printable ink—are provided on the dielectric layer, defining the areas to be illuminated. If an AC voltage is provided across the electrodes, the phosphor emits light through the transparent electrode and the substrate.

It is generally desired to concentrate the electric field between the electrodes over the phosphor. This is why a high dielectric constant dielectric such as Barium Titanate is used; less field is lost over the dielectric than if a lower dielectric constant dielectric were used.

It is desirable to achieve an even white surface to the EL display when not illuminated, particularly for use on domestic white goods such as washing machines. The phosphor is generally laid down in a pattern to correspond to the lit areas of the display. However, the phosphor is slightly yellow in colour, whereas Barium Titanate is bright white. When printed and cured, the bright white and yellow contrast, which provides an unacceptably non-uniform display.

SUMMARY OF THE INVENTION

One solution to this would be to provide a uniform layer of phosphor across the whole display. This leads to an overall yellow-buff colouration of the display, and is extremely wasteful of typically extremely expensive phosphor.

Alternatively, a white filter could be provided over the substrate distal from the transparent electrode. However, this leads to diffusion of the emitted light, and hence reduces the sharpness of the illuminated areas. This is undesirable as it leads to a loss of clarity of the display.

According to a first aspect of the invention, we provide an electroluminescent display comprising a substrate, a substantially transparent electrode adjacent to the substrate, a layer of electroluminescent material adjacent to the substantially transparent electrode, a layer of dielectric material adjacent to the layer of electroluminescent material and a further electrode adjacent to the dielectric layer, in which there is further provided an intermediate layer between the substantially transparent electrode and the layer of electroluminescent material.

The applicant has appreciated that it is possible to insert an extra layer between the substantially transparent electrode and for the display thereby formed to function correctly. This has several advantageous uses as will become apparent below. Previously, it would have been considered disadvantageous to do so, as electric field would be lost and the field strength across the phosphor diminished.

The intermediate layer may comprise a diffuser. The diffuser may act to diffuse light passing through it. This has the advantage that it can reduce the contrast between the phosphor and the dielectric layer when the display is not illuminated. Furthermore, it can avoid the problems with providing a diffuser on the side of the substrate distal from the electrode relating to blurring of the illuminated segments; it is advantageous to have a diffuser as close as possible to the light source otherwise its diffusing effect may be too extreme.

The diffuser may be substantially optically transparent other than its diffusing effect. It may be tinted white, or any other suitable colour.

The intermediate layer may comprise a protective layer. The applicant has appreciated that in the prior art display, the barium titanate in the dielectric layer can react with the Indium Tin Oxide (ITO) transparent electrode in some manner in the curing process to turn the ITO slightly yellow. In order to protect the ITO, the protective layer may be arranged to ensure separation of the dielectric material and the substantially transparent electrode during manufacture of the display.

The protective layer leads to a marked reduction in contrast between the areas where phosphor has been deposited and those where it has not. Furthermore, it can lead to an entirely unexpected improvement in the overall whiteness of the display, as the transparent electrode discolours less during the manufacturing process.

Preferably, the electroluminescent material comprises a phosphor such as Zinc Sulphide, typically encapsulated in glass or Aluminium Oxyhydroxide. Preferably, the substantially transparent electrode comprises indium tin oxide (ITO). Preferably, the dielectric layer comprises Barium Titanate, typically in a binder matrix such as a resin such as a fluoropolymer resin.

The intermediate layer may comprise a dielectric material. It may be a resin, such as a fluoropolymer resin.

We have also appreciated that the performance of the display may be enhanced by including a small concentration of Barium Titanate in the intermediate-layer. This increases the dielectric constant of the intermediate layer, and ensures that as little electric field is dropped over the intermediate layer as possible. It also has the advantageous effect of being able to tint the intermediate layer, typically white. The concentration of Barium Titanate in the intermediate layer may be 10% or less, or 5% or less, and is preferably about 3% or less. Concentrations of up to and including 50% have been found to give good results, but the applicants have appreciated that low concentrations give effective results.

The intermediate layer need only be thin enough to prevent to the desired level the discolouration of the ITO electrode, or to provide sufficient diffusion, or a combination thereof. As an example, an intermediate layer of thickness of from 1.5 µm to 10 µm has been found to give satisfactory results.

The intermediate layer may be coloured. By this, we mean that the layer is rendered non-white and not completely transparent in some manner. The intermediate layer may comprise a dye, which is preferably coloured. The layer may be coloured any colour such as blue, green, red or black. By providing a colouring to the intermediate layer, the advantageous effects of the invention can be used with displays which are other colours than white. Of course, the display may be white and the intermediate layer may be coloured white or be substantially uncoloured. In some embodiments the intermediate layer may be completely, or substantially completely, transparent.

Whilst the intermediate layer may have a uniform colour or shade, in a preferred alternative, the intermediate layer may be patterned so as to have a non-uniform appearance. This has been shown to decrease the apparent contrast of the display when not illuminated and may allow higher illumination levels to be achieved as less of the electroluminescent material is obscured.

Preferably, the pattern comprises a plurality of spots which may be dots. The spots are preferably arranged in a non-uniform manner, preferably a random, or pseudo-random, manner. In alternative embodiments, the marks may be varied according to a known function. The spots may be of non-uniform size; the size of the spots may vary in a random, or at least pseudo-random, manner. Although a circular shape for the spots is perhaps preferred (to give a dot), other shapes such as square, rectangular, random, or the like may also be possible.

The density of pattern—that is the fraction of area covered by pattern that is shaded or tinted—may be non-uniform across the pattern. In the case where the electroluminescent material is shaped to define a selectively illuminable display area (such as an icon to be pressed by a user), the pattern density may be lower over the display area than elsewhere. Preferably, change of pattern density between the display area and elsewhere is gradual; it is not a step change.

According to a second aspect of the invention, there is provided a method of making an electroluminescent display comprising:

providing a substrate with a substantially transparent electrode;

covering the substantially transparent electrode with an intermediate layer; and forming a layer of electroluminescent material over the intermediate layer, a dielectric layer over the electroluminescent layer and an electrode over the layer of electroluminescent material; and curing the structure thereby formed to form a display.

The intermediate layer preferably acts to reduce the interaction of the dielectric layer with the transparent electrode during curing of the structure. This is particularly important in the preferred case where the transparent electrode is an indium tin oxide electrode and especially where the dielectric layer comprises Barium Titanate.

Whilst in the preferred embodiment the step of forming an intermediate layer includes the step of forming a layer of dielectric material such as a resin over the substantially transparent electrode, the intermediate layer may be one that dissipates or otherwise disappears during the curing process.

The steps of forming any of the layer of electroluminescent material over the intermediate layer, the dielectric layer over the electroluminescent layer or the electrode over the layer of electroluminescent material may comprise printing those layers, typically using a silk-screen process.

The step of curing the display typically occurs after each of, or any one of, the layers are formed. The curing step may therefore comprise a number of discrete sub-steps, each curing the most recently-formed layer.

The display may be one according to the first aspect of the invention, and the integers of the device produced by the method may have any of the optional features of that first aspect.

The method may therefore also include the step of printing a non-uniform pattern on the intermediate layer. Preferably, the pattern comprises a plurality of spots which may be dots. The spots are preferably arranged in a non-uniform manner, preferably a random, or pseudo-random, manner, or alternatively the spots may be arranged according to a predetermined function. The spots may be of non-uniform size; the size of the spots may vary in a random, or at least pseudo-random, manner, or according to a predetermined function.

According to a third aspect of the invention, there is provided an electroluminescent display, comprising a selectively illuminable element surrounded by a non-illuminable area and a screen having a pattern of obscuring and non-obscuring areas partially obscuring the illuminable element, in which the ratio of obscuring areas to non-obscuring areas is less in the region of the illuminable element than in the vicinity of the non-illuminable area.

Advantageously, this has been found to reduce the apparent contrast of the illuminable element, when it is not illuminated, relative to the surrounding non-illuminable background. This is especially useful when the illuminable element comprises a electroluminescent phosphor. Preferably the change in the ratio of obscuring to non-obscuring areas between the illuminable and non-illuminable areas is gradual, in that it is not a step change.

Preferably, the pattern comprises a plurality of spots which may be dots. The spots are preferably arranged in a non-uniform manner, preferably a random, or pseudo-random, manner or according to a predetermined function. The spots may be of non-uniform size; the size of the spots may vary in a random, or at least pseudo-random, manner, or according to a predetermined function.

According to a fourth aspect of the invention, there is provided an electronic device provided with a display according to the first or third aspects of the invention.

These and other features of embodiments of the invention will become apparent to one of ordinary skill in the art upon review of the following detailed description when taken in conjunction with the drawings and appended claims.

BRIEF DESCRIPTION OF THE DRAWINGS

There now follows, by way of example only, an embodiment of the present invention described with reference to the accompanying drawings, in which:

FIG. 1 shows a prior art electroluminescent display;

FIG. 2 shows the layer structure of a part of an electroluminescent display according to the present invention;

DETAILED DESCRIPTION OF PREFERRED EMBODIMENTS

Figure 3:
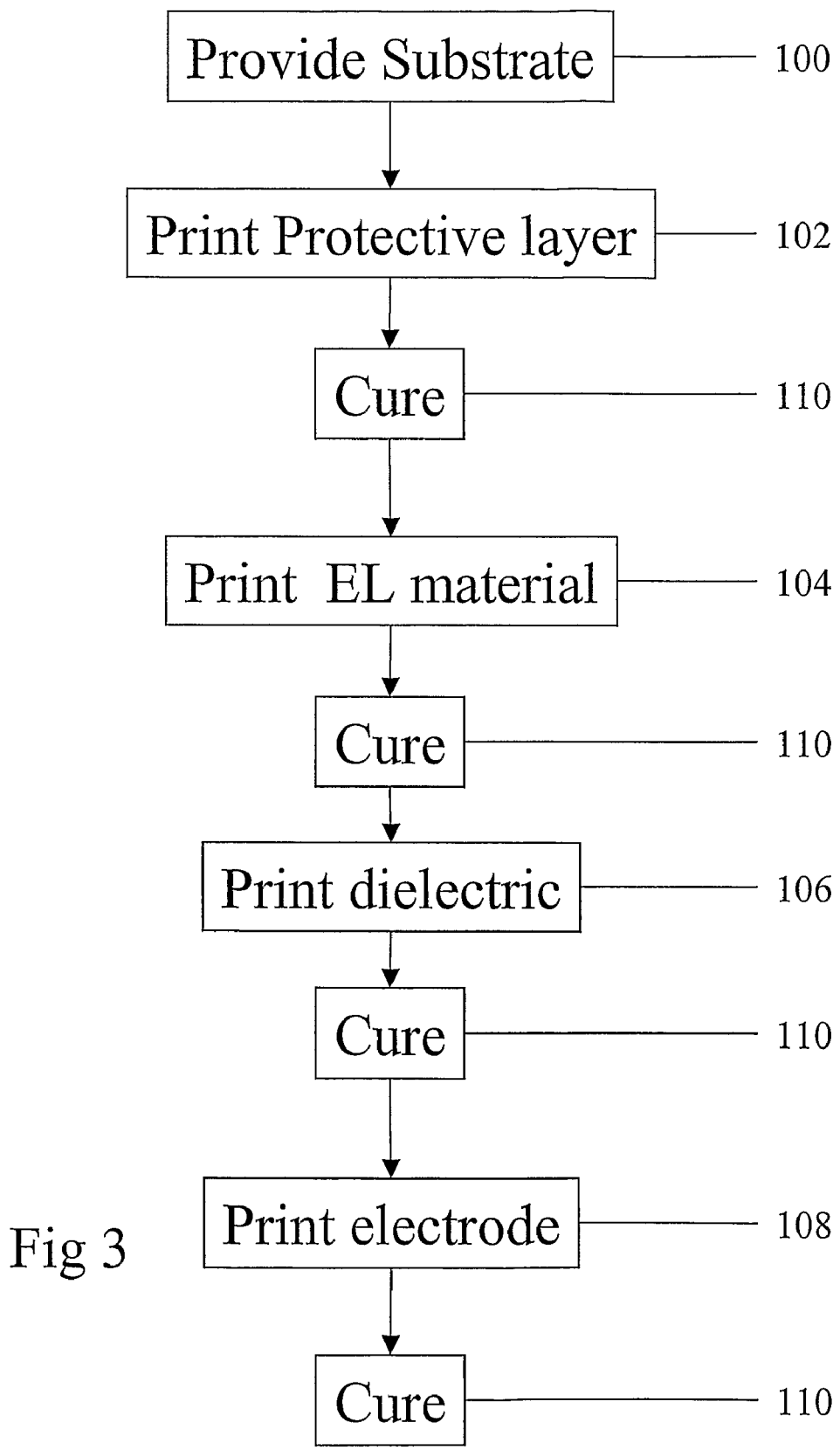
FIG. 3 shows a flow chart depicting a method of manufacture of the display of FIG. 1.

FIG. 1 shows a typical prior art EL display. The essential elements of the lamp are electroluminescent particles, such as phosphor, which are held between two electrodes 2, 5. One of the electrodes is a transparent electrode 2, of Indium Tin Oxide (ITO). Over this is laid a layer of electroluminescent material 3, comprising electroluminescent particles encapsulated in Aluminium Oxyhydroxide beads and held in a dielectric matrix. A further layer of dielectric 4 is provided over the phosphor 3 in order to avoid short-circuiting problems. A further electrode 5 comprising a silver-loaded printed ink is provided over the dielectric layer 4. The whole display is laid out on a substrate 1, typically of PET plastics. The dielectric 4 comprises Barium Titanate in a fluoropolymer resin matrix.

When an electric field is present between the two electrodes 2, 5, the EL display emits light through transparent electrode 2 and substrate 1.

However, as discussed above, this structure has been found to yellow during curing. Accordingly, the EL display shown in FIG. 2 of the accompanying drawings is modified by the introduction of a protective intermediate layer 6 between the ITO electrode 2 and the phosphor 3. This layer comprises a 10% concentration mixture of Barium Titanate in a fluoropolymer resin.

The intermediate layer 6 also acts as a diffuser, smoothing out any contrast between areas of phosphor and those areas without when the display is not illuminated. The Barium Titanate tints this intermediate layer white, to aid in the improvement of the contrast when not illuminated. Furthermore, the intermediate layer 6 acts as a protective layer, separating the Barium Titanate-rich dielectric layer 4 from the ITO electrode 2. This reduces the amount of yellowing of the electrode 2 during curing.

In an alternative, the protective layer can be coloured, typically by the inclusion of a dye. This allows the advantageous effects of the protective layer reducing the contrast of the display in the off state to used with displays other than white. An example of such a dye is X.

The display is constructed using sequential layers of screen-printing. Screen printing is a long established technique where material is applied to a surface through a fine mesh of controlled thickness and open area. The material is forced through open areas of the mesh using a rubber squeegee and then cured; careful control of the printing and curing process gives highly reproducible results.

Curing of the different inks is commonly done by either heat or UV cure. For heat cure inks a heated tunnel is used to drive out volatiles from the ink and cause it to cure. UV systems utilize a high intensity lamp to cross link the paste and produce the cure.

To form the display of FIG. 2 of the accompanying drawings, the method of FIG. 3 of the accompanying drawings is carried out. A PET substrate 1 sputtered with Indium Tin Oxide (to form the transparent electrode 2) is provided at step 100. At step 102, the protective layer 6 is printed 102 (using a silk-screen process) onto the substrate 1. The remaining layers—the electroluminescent layer 104, the dielectric layer 106 and the silver electrode 108—are then built up by silk-screen printing. The structure is cured 110 after each printing step to form the display.

The protective layer 6 need only be thin enough to prevent to the desired level the discolouration of the ITO electrode. In the above-described case, a protective layer 6 of thickness between 1.5 µm and 10 µm has been found to give satisfactory results.

Figure 4:
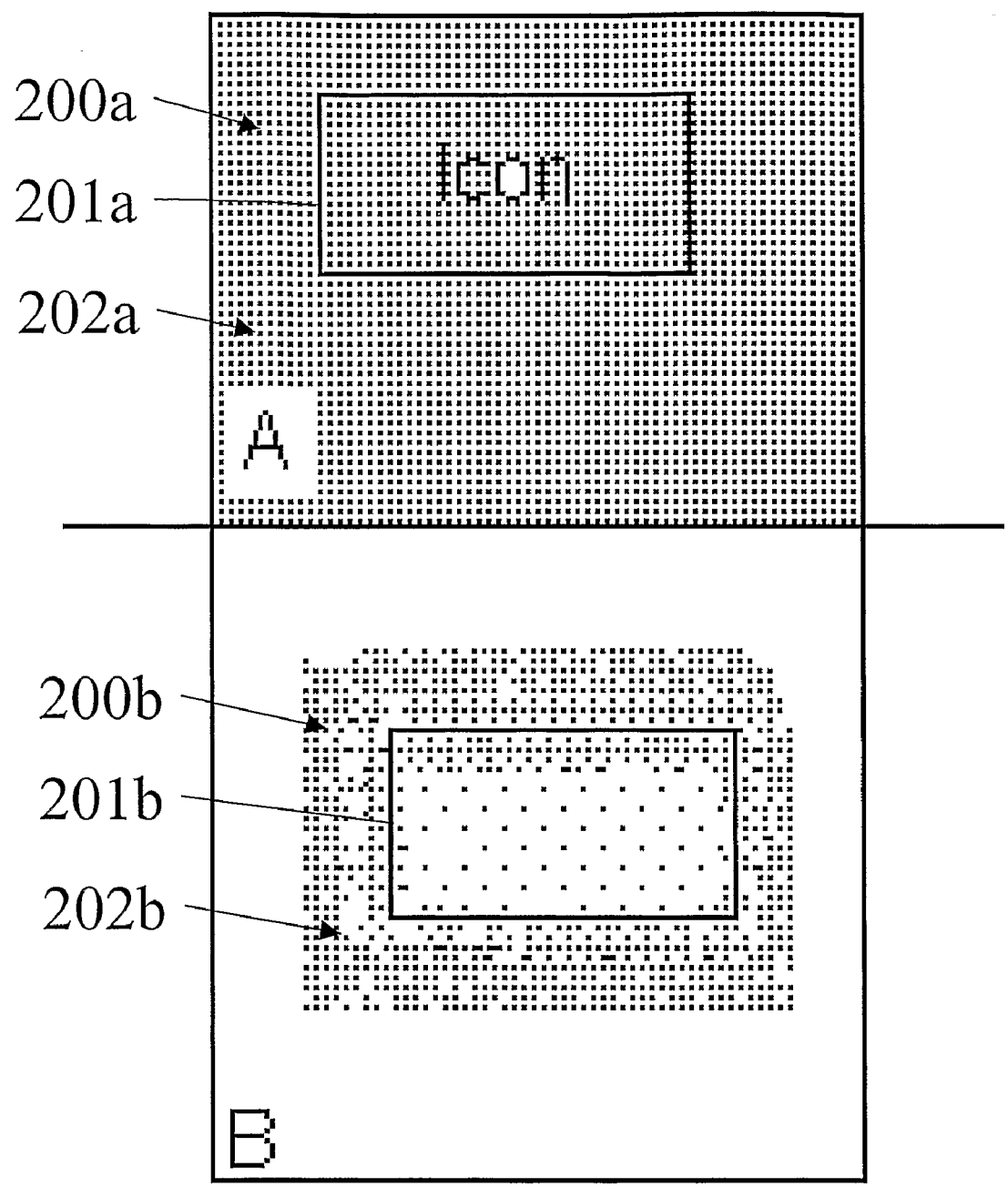
FIG. 4 shows two examples of how a pattern can be used in the intermediate layer.

FIG. 4 shows two possible alternative arrangements for the intermediate layer. In the above embodiments, the intermediate layer is substantially uniformly tinted white by the presence of Barium Titanate. However, the applicants have appreciated that the apparent contrast between the phosphor and the surrounding area when the phosphor is not illuminated can be reduced by forming a pattern of dots over the intermediate layer.

In arrangement A, the dots 200a are laid out in a uniform pattern, both over an illuminable icon 201a and in the surrounding area 202a. However, an even more advantageous effect can be generated by using arrangement B. In this, the pattern of dots 200b is non-uniform. Generally, the dots 200b are randomly distributed, as schematically shown in the Figure. The density of dots 200b also varies between the area over illuminable icon 201b and the surrounding area 202b; the density of dots 200b over the icon 201b is lower than in the surrounding area 202b. Furthermore, the change in density is gradual over the border of the icon 201b.

This has several beneficial effects. The blurring of the border and the overlap with the icon helps to break up the straight lines of the icon making them less obvious. Furthermore, reducing the density of the dots over the icons will increase the light output, especially compared to a simple solid Printed White Layer. Use of multiple layers would allow for different colours to be used allowing the more effect camouflaging of the generally orange phosphor.

Conveniently, the pattern is printed on the intermediate layer using a screen printing process as described above.

It should be apparent that the foregoing relates only to embodiments of the invention and that numerous changes and modification may be made herein by one of ordinary skill in the art without departing from the general scope of the invention as defined by the following claims.

The invention claimed is:

1. An electroluminescent display comprising:
a substrate;
a substantially transparent electrode adjacent to the substrate;
a layer of electroluminescent material adjacent to the substantially transparent electrode;
a layer of dielectric material adjacent to the layer of electroluminescent material;
a further electrode adjacent to the dielectric layer; and
an intermediate layer between the substantially transparent electrode and the layer of electroluminescent material; wherein
the intermediate layer includes a diffuser arranged to diffuse light passing therethrough.

2. The electroluminescent display of claim 1, in which the diffuser is substantially optically transparent other than its diffusing effect.

3. The electroluminescent display of claim 1, in which the intermediate layer comprises a protective layer.

4. The electroluminescent display of claim 3, in which the protective layer is arranged to ensure separation of the dielectric material and the substantially transparent electrode during manufacture of the display.

5. The electroluminescent display of claim 1, in which the substantially transparent electrode comprises indium tin oxide.

6. The electroluminescent display of claim 1, in which the dielectric layer comprises Barium Titanate.

7. The electroluminescent display of claim 1, in which the protective layer comprises a least one of the following: a dielectric material, or a fluoropolymer resin.

8. The electroluminescent display of claim 1, in which the intermediate layer comprises a small concentration of Barium Titanate.

9. The electroluminescent display of claim 8, in which the concentration of Barium Titanate in the protective layer is about 10% or less.

10. The electroluminescent display of claim 1, in which the intermediate layer has a thickness of from about 1.5 µm to about 10 µm.

11. The electroluminescent display of claim 1, in which the intermediate layer is coloured.

12. The electroluminescent display of claim 1, in which the intermediate layer is patterned so as to have a non-uniform appearance.

13. The electroluminescent display of claim 12, in which the pattern comprises a plurality of spots.

14. The electroluminescent display of claim 13, in which the spots are arranged in a random, or pseudo-random, manner or according to a predetermined function.

15. The electroluminescent display of claim 13, in which the spots are of non-uniform size.

16. The electroluminescent display of claim 12, in which the density of the pattern is non-uniform.

17. The electroluminescent display of claim 16, in which the electroluminescent material is shaped to define a selectively illuminable display area and in which the pattern density is lower over the display area than elsewhere.

18. The electroluminescent display of claim 17, in which the change of pattern density between the display area and elsewhere is gradual.

19. A method of making an electroluminescent display comprising:
   providing a substrate with a substantially transparent electrode;
   covering the substantially transparent electrode with an intermediate layer; and
   forming a layer of electroluminescent material over the intermediate layer, a dielectric layer over the electroluminescent layer and an electrode over the layer of electroluminescent material; and
   drying the structure thereby formed to form a display; wherein
   the intermediate layer includes a diffuser arranged to diffuse light passing therethrough.

20. The method of claim 19, in which the intermediate layer acts to reduce the interaction of the dielectric layer with the transparent electrode during drying of the structure.

21. The method of claim 19, in which forming of the layer of electroluminescent material over the intermediate layer, the dielectric layer over the electroluminescent layer, and the electrode over the layer of electroluminescent material comprises printing each of the layers.

22. The method of claim 19, in which the drying step occurs after each layer is formed.

23. The method of claim 19, further comprising printing a non-uniform pattern on the intermediate layer.

24. The method of claim 19, in which the display thereby made is in accordance with any of claims 1 to 18.

25. An electroluminescent display, comprising a selectively illuminable element surrounded by a non-illuminable area and a screen having a pattern of obscuring and non-obscuring areas partially obscuring the illuminable element, in which the ratio of obscuring areas to non-obscuring areas is less in the region of the illuminable element than in the vicinity of the non-illuminable area.

26. The electroluminescent display of claim 25, in which the illuminable element comprises an electroluminescent phosphor.

27. The electroluminescent display of claim 25, in which the change in the ratio of obscuring to non-obscuring areas between the illuminable and non-illuminable areas is gradual.

28. The electroluminescent display of claim 25, in which the pattern comprises a plurality of spots.

29. The electroluminescent display of claim 28, in which the spots are arranged in a non-uniform manner.

30. The electroluminescent display of claim 29, in which the spots are arranged in a random, or pseudo-random, manner, or according to a predetermined function.

31. The electroluminescent display of claim 29, in which the spots are of non-uniform size.

32. The electroluminescent display of claim 31, in which the size of the spots varies in a random, or pseudo-random, manner.

33. An electronic device provided with a display according to any of claims 1 to 18 or claims 25 to 32.

* * * * *